Patented Feb. 26, 1946

2,395,684

UNITED STATES PATENT OFFICE 2,395,684

STABILIZATION OF VINYL ETHER POLYMERS

Calvin E. Schildknecht, Easton, Pa., assignor to General Aniline & Film Corporation, New York, N. Y., a corporation of Delaware No Drawing. Application December 23, 1944, Serial No. 569,654

12 Claims. (Cl. 260—90)

This invention relates to the stabilization of vinyl ether polymers and to the stabilized polymers.

The vinyl ether polymers are sensitive to heat and by this agency suffer depolymerization or breakdown in molecular weight, chiefly to lower polymers and the alcohols from which the vinyl ether monomers were derived. Secondarily, the alcohols may undergo air oxidation to aldehydes, ketones, or acids. Depending upon the temperature and length of the exposure, the polymers lose their valuable properties to varying degrees, for example, the higher molecular weight polymers are subject to loss in their rubber-like properties of pressure tack, elasticity, nerve, and form-stability. While the depolymerization is more rapid at elevated temperatures, it is not limited thereto, but takes place even at room temperature in contrast to the behavior of polystyrene and methyl methacrylate polymers which suffer depolymerization only at relatively elevated temperatures, e. g., at 200–300° C.

This sensitivity of the polymers to heat is a serious hindrance to their successful application in the arts, particularly in respect to the use of the medium to high molecular weight rubber-like polymers as substitutes for rubber, for example, in the preparation of pressure adhesives. It is, accordingly, desirable to protect them against thermal depolymerization and resulting loss in valuable properties.

I have found that depolymerization of the vinyl ether polymers by heat may be retarded by incorporating in the polymers as a stabilizer therefor, a fine dispersion of a small amount of the sulfide or polysufide of an alkali metal or alkaline earth metal.

The amount of the sulfide or polysulfide, e. g., sodium sulfide, potassium sulfide, calcium sulfide, magnesium sulfide, sodium polysulfide, calcium polysulfide, etc., added to the polymers will depend on the degree of stabilization desired therein. Sodium sulfide and sodium polysulfide constitute preferred stabilizers from the standpoint of cost and activity. In general, from about 0.05–3% of the stabilizer on the weight of the polymer will be effective in retarding depolymerization and conserving the inherent physical characteristics of the polymers on exposure to heat.

The stabilizer should be finely divided, e. g., of about 1–10 microns in particle size, and finely dispersed in the polymer for best results. Fine dispersion of the stabilizer in the polymers may be accomplished by dissolving the polymer in a suitable volatile organic solvent, for example, in carbon disulfide, benzene, etc., adding the stabilizer to the solution, either in the solid form or as a solution or suspension in a further quantity of the solvent, using if necessary a small amount of another volatile organic liquid to promote solubility of the stabilizer in the solvent, and stirring to effect a fine dispersion of the stabilizer in the polymer solution. For example, where a solid rubbery polymer is treated in the foregoing manner and it is desired to regain the rubbery form of the polymer in the stabilized condition, the solvent is evaporated from the solution in a warm atmosphere, e. g., at about 50° C., at normal pressure or under a vacuum, to recover the rubbery polymer in the stabilized condition. The stabilizer also may be incorporated in the rubbery polymers by mixing in a Werner-Pfleiderer mixer.

As it is advantageous to add the stabilizer to the freshly formed polymers before objectionable depolymerization has taken place, the stabilizer may be added to the polymer in the polymerization vessel during the quenching or inactivation of the catalyst in the acid-catalyst type polymerization process. In this process the polymer is stirred in the reaction vessel with sufficient of an agent in the form of an aqueous alkaline compound, e. g., concentrated ammonium hydroxide, to neutralize or inactivate the acid catalyst, preferably accompanied by a quantity of methanol. The stabilizer is added along with the quenching agent and stirred into the polymer at the same time.

Stabilization according to the invention may be applied to the polymers of any of the vinyl ethers, for example, to those described in United States Patent No. 2,104,000, e. g., to the polymers of vinyl isopropyl ether, vinyl n-butyl ether, vinyl isobutyl ether, etc., to protect them against the effect of heat, while at the same time affording them also a measure of protection against the depolymerizing effect of light and air. The polymers may be, for example, in the form of products which are viscous liquids, balsams, waxes, or soft resins as described in the aforesaid patent, or in the form of rubber-like products of higher molecular weight, e. g., the rubbery vinyl isobutyl ether polymers described in United States Patent No. 2,061,934. Depending upon the particular vinyl ether, rubbery polymers may be obtained, for example, by the polymerization of the vinyl ether monomer at low temperatures, e. g., from about −40° C. to above about −110° C., in the presence of a liquid organic diluent for the monomer which is a non-solvent for the polymer at the low reaction temperatures, for example, a liquid or liquefied hydrocarbon or a chlorinated hydrocarbon, e. g., propane, butane, methylene chloride, etc., and a suitable acid-reacting catalyst of the kind described in the aforementioned patents, e. g., boron fluoride or boron fluoride-diethyl ether addition compound, the catalyst being quenched after the polymerization, the polymer recovered from the diluent as by filtration, and dried at about 50° C. at normal pressure or under a vacuum.

The vinyl ethers employed in the production of the polymers may be those obtained from the reaction of acetylene and the corresponding alcohols, which monomers have been subjected to washing with water to remove alcohol and any aldehyde present. In some cases it may be necessary to further purify the monomers as alcohols and aldehydes are inimical to the functioning of acid-reacting catalysts. This further purification may be accomplished by allowing the monomers to stand over powdered potassium hydroxide or metallic sodium for about 24 hours and then fractionally distilling them from the solid treating agent. One precise fractional distillation is generally sufficient.

The effect of the alkali metal and alkaline earth metal sulfides and polysulfides in stabilizing the polymers against depolymerization by heat may be demonstrated in the terms of the viscosities of the stabilized and unstabilized polymers before and after heating. The drop in viscosity of the polymers after exposure to heat is a measure of the degree to which depolymerization has taken place therein, the greater this drop, the correspondingly greater the depolymerization and consequent loss of physical properties therefrom. All viscosities mentioned herein are specific viscosities calculated from relative viscosities determined in an Ostwald-Fenske capillary viscometer at 25° C. on benzene solutions of the polymer samples made up in the proportion of 1 gram of the polymer in 100 ml. of benzene.

The invention is further illustrated by the following specific examples to which, however, it is not to be limited. Parts are by weight and viscosities were determined as described above.

Example 1

Samples of a rubber-like high polymer of vinyl n-butyl ether of specific viscosity 5, obtained by the dropwise addition of boron fluoride-diethyl ether addition compound to a mixture of purified vinyl n-butyl ether in propane (1 to 4) at −70° C. until the polymerization was completed, the boron fluoride in the polymer then quenched by stirring the latter with a quantity of methanol containing sufficient concentrated ammonium hydroxide to neutralize the boron fluoride, and the polymer thereafter dried at about 50° C. under vacuum, were dissolved in a solvent consisting of benzene and a small amount of methanol in the ratio of 10 parts of the polymer to 100 parts of the solvent.

To one of the solvent solutions of the polymer was added 2% of finely ground sodium sulfide on the weight of the polymer and the whole well stirred to disperse the stabilizer therein. To the other solution no addition was made. The solvent was then evaporated from the solutions at 50° C. under vacuum to recover the polymers in rubber-like condition.

The dried rubber-like polymers, the one containing sodium sulfide dispersed therein and the other not containing the stabilizer and constituting the control, were heated in air at 100° C. for three hours and then made up in benzene solution in the proportion of 1 gram of polymer per 100 ml. of benzene. The viscosities of the polymers were determined by means of the benzene solutions in an Ostwald-Fenske capillary viscometer at 25° C. The polymer containing the dispersed sodium sulfide showed a specific viscosity of 4.9 as against a value of 0.70 for the control polymer. As is apparent from a comparison of the respective viscosity values, the unstabilized polymer suffered extensive depolymerization becoming a soft, sticky mass, whereas the stabilized polymer still retained substantially all of its rubber-like character.

Example 2

Samples of the vinyl n-butyl ether high polymer of specific viscosity 5 described in Example 1 were made up in benzene-methanol solution, a stabilizer in the form of 1% of finely ground sodium polysulfide on the polymer added to one of the solutions, and the solutions of the test and control polymers subjected to evaporation of the solvent to recover the rubbery polymer, all in the manner described in Example 1. The dried polymers were then heated in air at 150° C. for three hours.

Determination of the specific viscosities of the heat-exposed polymer samples at 25° C. showed the following results: specific viscosity of the sodium polysulfide containing polymer=1.7; specific viscosity of the control polymer=0.7. It is readily apparent from these comparative viscosities that the unstabilized polymer suffered a considerably greater degree of depolymerization on exposure to the heat.

Example 3

Into a further quantity of the rubbery vinyl n-butyl ether polymer described in the previous examples was incorporated 1% of finely divided calcium polysulfide on the polymer following the procedure of these examples. A control without the stabilizer was likewise prepared. The polymer samples were then heated in air at 150° C. for one hour. Determining viscosities of the heat exposed polymer samples as before showed a specific viscosity for the calcium polysulfide containing polymer of 1.1 and for the control polymer a value of 0.8. Here again it is apparent from the viscosity values that the unprotected polymer suffered greater depolymerization.

I claim:

1. A process of improving the resistance to depolymerization by heat of a polymerized vinyl ether which comprises finely dispersing therein from about .05–3% of a member of the group consisting of the alkali metal and alkaline earth metal sulfides and polysulfides.

2. A process of improving the resistance to depolymerization by heat of a polymerized vinyl ether which comprises finely dispersing therein from about .05–3% of an alkali metal sulfide.

3. The process as defined in claim 2, wherein the alkali metal sulfide is sodium sulfide.

4. A process of improving the resistance to depolymerization by heat of a polymerized vinyl isopropyl ether which comprises finely dispersing therein from about .05–3% of sodium sulfide.

5. A process of improving the resistance to depolymerization by heat of a polymerized vinyl n-butyl ether which comprises finely dispersing therein from about .05–3% of sodium sulfide.

6. A process of improving the resistance to depolymerization by heat of a polymerized vinyl isobutyl ether which comprises finely dispersing therein from about .05–3% of sodium sulfide.

7. A vinyl ether polymer of improved resistance to depolymerization by heat in which is finely dispersed about .05–3% of a member of the group consisting of the alkali metal and alkaline earth metal sulfides and polysulfides.

8. A vinyl ether polymer of improved resistance to depolymerization by heat in which is finely dispersed about .05–3% of an alkali metal sulfide.

9. A vinyl ether polymer of improved resistance to depolymerization by heat in which is finely dispersed about .05–3% of sodium sulfide.

10. A vinyl isopropyl ether polymer of improved resistance to depolymerization by heat in which is finely dispersed about .05–3% of sodium sulfide.

11. A vinyl n-butyl ether polymer of improved resistance to depolymerization by heat in which is finely dispersed about .05–3% of soduim sulfide.

12. A vinyl isobutyl ether polymer of improved resistance to depolymerization by heat in which is finely dispersed about .05–3% of sodium sulfide.

CALVIN E. SCHILDKNECHT.